US010216424B1

(12) United States Patent
De Keyser et al.

(10) Patent No.: US 10,216,424 B1
(45) Date of Patent: Feb. 26, 2019

(54) STAGING OF WRITE OPERATIONS FOR CONTAINER-BASED STORAGE FOR SEQUENTIAL MEDIA

(71) Applicant: Western Digital Technologies, Inc., San Jose, CA (US)

(72) Inventors: Koen De Keyser, Sint-Denijs-Westrem (BE); Frederik Jacqueline Luc De Schrijver, Wenduine (BE); Stijn Blyweert, Huizingen (BE); Mark Christiaens, Westrem (BE)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/961,877

(22) Filed: Apr. 25, 2018

(51) Int. Cl.
G11B 15/087 (2006.01)
G11B 20/12 (2006.01)
G06F 3/06 (2006.01)

(52) U.S. Cl.
CPC .......... G06F 3/061 (2013.01); G06F 3/0676 (2013.01); G11B 20/1217 (2013.01); G11B 2020/1238 (2013.01)

(58) Field of Classification Search
CPC ...... G06F 3/0661; G06F 3/0604; G06F 3/067; G06F 3/0608; G06F 3/0656; G06F 3/0689; G06F 11/1471; G06F 11/1666; G06F 12/0866; G06F 2212/465; G06F 2212/466; G06F 17/30156; G06F 17/30159; G06F 15/167; G06F 17/30224; G06F 13/24; H04L 67/1097; H04L 67/32; H04L 67/16; G11B 20/12; G11B 15/087; G11B 20/1217

USPC ........................................................... 360/69
See application file for complete search history.

(56) References Cited

U.S. PATENT DOCUMENTS

| | | |
|---|---|---|
| 7,739,312 B2 | 6/2010 | Gordon et al. |
| 8,723,703 B2 | 5/2014 | Oh et al. |
| 8,782,011 B2 * | 7/2014 | Guo .................. G06F 17/30138 707/664 |
| 9,128,950 B2 | 9/2015 | Huang |
| 9,256,383 B2 | 2/2016 | De Spiegeleer |
| 9,699,255 B2 | 7/2017 | De Spiegeleer |
| 2015/0127975 A1 | 5/2015 | Patterson et al. |
| 2015/0248402 A1 | 9/2015 | Patterson, III et al. |

(Continued)

FOREIGN PATENT DOCUMENTS

WO 2017140939 A1 8/2017

Primary Examiner — Nabil Z Hindi
(74) Attorney, Agent, or Firm — Patent Law Works LLP

(57) ABSTRACT

A set of encoded data fragments is grouped into a container object in sequential order. Each encoded data fragment is a specific fragment size, and the container object is a specific container object size. The sequential order of the set of encoded data fragments can be tracked in a log in memory, such that the location of any one of the data fragments in the container object can be determined. The container object can be stored directly on a specific backend storage element, without using a file system. A corresponding container object identifier identifies the physical storage location of the container object on the backend storage element. The container object identifier is tracked in the log in memory, such that the physical location on the backend storage element of any specific one of the set of encoded data fragments in the container object can be determined.

20 Claims, 2 Drawing Sheets

(56) References Cited

U.S. PATENT DOCUMENTS

2016/0077988 A1 3/2016 Tipton et al.
2016/0085681 A1 3/2016 Aya et al.
2017/0177266 A1 6/2017 Doerner et al.

* cited by examiner

STAGING OF WRITE OPERATIONS FOR CONTAINER-BASED STORAGE FOR SEQUENTIAL MEDIA

TECHNICAL FIELD

The present disclosure pertains generally to storage systems, and more specifically to container-based storage for sequential media and staging of write operations.

BACKGROUND

The rise in electronic and digital device technology has rapidly changed the way society communicates, interacts, and consumes goods and services. Modern computing devices allow organizations and users to have access to a variety of useful applications in many locations. Using such applications results in the generation of a large amount of data. Storing and retrieving the produced data is a significant challenge associated with providing useful applications and devices.

The data generated by online services and other applications can be stored at data storage facilities. As the amount of data grows, having a plurality of users sending and requesting data can result in complications that reduce efficiency and speed. Quick and reliable access in storage systems is important for good performance.

Distributed encoded storage systems typically divide each data object to be stored into a plurality of encoded fragments, which are spread across multiple backend storage elements. A distributed encoded storage system maintains metadata which identifies each stored data object, specifies where in the system each data object is stored, including where the encoded data fragments have been distributed and hence from where they can subsequently be retrieved, what type of encoding has been used, etc. For each encoded fragment of the data object metadata such as an identifier, location information and encoding information are maintained. Thus, storage of a single data object generates a large amount of associated metadata.

So that the encoded fragments of a data object can be retrieved during a read operation, conventionally this metadata is maintained and managed by the distributed encoded storage system as a low level data structure. For example, this can be in the form of a hierarchical data structure such as a suitable directory tree of a file system, with corresponding metadata relating a particular data object identifier to the location in the directory tree of encoded fragments.

As noted above, under distributed encoded storage systems, such as for example erasure encoded distributed storage systems, each data object generates a large number of encoded data fragments which need to be stored in the backend. As the number of data objects being stored grows, for example to over one hundred million data objects, the size of the directory tree (or other data structure) of the file system and the corresponding metadata tends to grow beyond the maximum size which can be stored in the main memory of the encoding servers and/or the backend storage entities, and thus needs to be cached to storage media. This leads to an increased level of random input/output operations per second ("IOPS"), in addition to the already high level of IOPS being generated by the high number of encoded fragments for each data object. Conventionally, this can give rise to, e.g., three or four random input/output operations per encoded fragment during a backend read or write operation. This leads to a reduced level of responsiveness of the distributed encoded storage system, and is not generally compatible with storage media that are optimized for sequential storage, such as for example shingled magnetic recording ("SMR") disks.

It would be desirable to address at least these issues.

SUMMARY

Distributed encoded storage is made compatible with the use of SMR disks and other types of sequential storage elements in the backend of a distributed encoded storage system. A set of encoded data fragments is grouped into a container object in a sequential order. Each encoded data fragment is a common data fragment size, and the container object is a specific predetermined container object size. The sequential order of the set of encoded data fragments in the container object is tracked in a log (e.g., in system memory or in the container object itself), such that the location of any specific one of the set of encoded data fragments in the container object can be determined as a function of the position of the specific encoded data fragment in the tracked sequential order and the common data fragment size. The container object is transmitted to the backend of the distributed encoded data storage system, wherein it is stored directly on a specific backend storage element (for example, an SMR disk). It is to be understood that the direct storage of the container object on the specific backend storage element can (but need not) be performed without using a file system. The backend returns a corresponding container object identifier, which identifies the physical storage location of the container object on the specific backend storage element (e.g., a specific band of the SMR disk). The container object identifier is tracked in the log, such that the physical location on the specific backend storage element of any specific one of the set of encoded data fragments in the container object can be determined as a function of a position of the specific encoded data fragment in the tracked sequential order, the common data fragment size, and the physical storage location of the container object on the specific backend storage element as identified by the tracked container object identifier. This provides increased responsiveness, efficiency and throughput, by reducing the number of IOPS generally and random IOPS in particular.

A system of one or more computers can be configured to perform particular operations or actions by virtue of having software, firmware, hardware, or a combination of these installed on the system, where the software, firmware and/or hardware cause(s) the system to perform the actions. One or more computer programs can be configured to perform particular operations or actions by virtue of including instructions that, when executed by data processing apparatus, cause the apparatus to perform the actions.

One general aspect includes a computer-implemented method comprising: encoding a data object into a plurality of encoded data fragments, each encoded data fragment being of a common fragment format and being a common data fragment size; grouping a set of encoded data fragments into a container object in a sequential order, each encoded data fragment being the common data fragment size, and the container object being a specific predetermined container object size; tracking the sequential order of the set of encoded data fragments in the container object, in a sequential transaction log, wherein a location of any specific one of the set of encoded data fragments in the container object is a function of a position of the specific encoded data fragment in the tracked sequential order and the common data fragment size; transmitting the container object to a backend of a distributed encoded data storage system, wherein the container object is stored directly on a specific backend storage element; in response to transmitting the container object, receiving a container object identifier corresponding to the container object, from the backend of the distributed encoded data storage system, wherein the container object identifier identifies a physical storage location of the container object on the specific backend storage element; and tracking the received container object identifier corresponding to the container object in the sequential transaction log, wherein a physical location on the specific backend storage element of any specific one of the set of encoded data fragments in the container object is a function of a position of the specific encoded data fragment in the tracked sequential order, the common data fragment size, and the physical storage location of the container object on the specific backend storage element as identified by the tracked container object identifier.

Another general aspect includes a computer system comprising: a processor; system memory; a plurality of electromechanical backend storage elements; instructions in the system memory programmed to encode a data object into a plurality of encoded data fragments, each encoded data fragment being of a common fragment format and being a common data fragment size; instructions in the system memory programmed to group a set of encoded data fragments into a container object in a sequential order, each encoded data fragment being the common data fragment size, and the container object being a specific predetermined container object size; instructions in the system memory programmed to track the sequential order of the set of encoded data fragments in the container object, in a sequential transaction log, wherein a location of any specific one of the set of encoded data fragments in the container object is a function of a position of the specific encoded data fragment in the tracked sequential order and the common data fragment size; instructions in the system memory programmed to transmit the container object to a backend of a distributed encoded data storage system, wherein the container object is stored directly on a specific backend storage element; instructions in the system memory programmed to receive a container object identifier corresponding to the container object, from the backend of the distributed encoded data storage system, in response to transmitting the container object, wherein the container object identifier identifies a physical storage location of the container object on the specific backend storage element; and instructions in the system memory programmed to track the received container object identifier corresponding to the container object in the sequential transaction log, wherein a physical location on the specific backend storage element of any specific one of the set of encoded data fragments in the container object is a function of a position of the specific encoded data fragment in the tracked sequential order, the common data fragment size, and the physical storage location of the container object on the specific backend storage element as identified by the tracked container object identifier.

Another general aspect includes a computer system comprising: means for encoding a data object into a plurality of encoded data fragments, each encoded data fragment being of a common fragment format and being a common data fragment size; means for grouping a set of encoded data fragments into a container object in a sequential order, each encoded data fragment being the common data fragment size, and the container object being a specific predetermined container object size; means for tracking the sequential order of the set of encoded data fragments in the container object, in a sequential transaction log, wherein a location of any specific one of the set of encoded data fragments in the container object is a function of a position of the specific encoded data fragment in the tracked sequential order and the common data fragment size; means for transmitting the container object to a backend of a distributed encoded data storage system, wherein the container object is stored directly on a specific backend storage element; means for receiving a container object identifier corresponding to the container object, from the backend of the distributed encoded data storage system, in response to transmitting the container object, wherein the container object identifier identifies a physical storage location of the container object on the specific backend storage element; and means for tracking the received container object identifier corresponding to the container object in the sequential transaction log, wherein a physical location on the specific backend storage element of any specific one of the set of encoded data fragments in the container object is a function of a position of the specific encoded data fragment in the tracked sequential order, the common data fragment size, and the physical storage location of the container object on the specific backend storage element as identified by the tracked container object identifier.

Other embodiments of this aspect include corresponding computer systems, system means, apparatus, and computer programs recorded on one or more computer storage devices, each configured to perform the actions of the methods.

Some implementations may optionally include one or more of the following features: that the container object is stored directly on a specific backend storage element without using a file system; that the specific backend storage element further comprises a shingled magnetic recording (SMR) disk; that the specific predetermined container object size corresponds to a size of a band of the SMR disk; that storing the container object directly on a specific band of the SMR disk; and/or that physical storage location of the container object on the specific backend storage element further comprises a specific band of the SMR disk. The feature of transmitting a second container object containing a second set of encoded data fragments to the backend of the distributed encoded data storage system, wherein the second container object is stored sequentially after the first container object on the specific backend storage element (e.g., without using a file system), in response to transmitting the second container object, receiving a second container object identifier corresponding to the second container object, from the backend of the distributed encoded data storage system, wherein the second container object identifier identifies a physical storage location of the second container object on the specific backend storage element, and tracking the second received container object identifier in the sequential transaction log. The feature of storing a first container object directly on a first specific band of a specific SMR disk, and storing the second container object directly on a second specific band of the specific SMR disk. The features of tracking data fragment-level write operations in the sequential transaction log, reordering a random order sequence of tracked data fragment-level write operations while the tracked data fragment-level write operations are being processed in system memory, wherein reordering further comprises sorting the set of encoded data fragments being grouped into the container object into the tracked sequential order, and subsequently to the reordering step, writing the container object from system memory to the specific backend storage element. The feature of maintaining an association between the plurality of encoded data fragments and the data object. The features of receiving a read request from a client application targeting the data object; retrieving the plurality of encoded data fragments from at least one container object on the specific backend storage element, using the sequential transaction log, (optionally without using a file system); decoding the data object from the plurality of encoded data fragments; and providing the data object to the client application. The features of retrieving a specific encoded data fragment from the specific backend storage element, using the sequential transaction log(with or without using a file system). The features of retrieving a specific container object from the specific backend storage element, using the sequential transaction log (e.g., without using a file system). That the specific backend storage element further comprises a tape storage element or the specific backend storage element further comprises an optical storage element.

Note that the above list of features is not all-inclusive and many additional features and advantages are contemplated and fall within the scope of the present disclosure. Moreover, the language used in the present disclosure has been principally selected for readability and instructional purposes, and not to limit the scope of the subject matter disclosed herein.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The present disclosure describes technology, which may include methods, systems, apparatuses, computer program products, and other implementations, that render distributed encoded storage compatible with the use of SMR disks and other types of sequential storage elements in the backend of a distributed encoded storage system. This provides increased responsiveness, efficiency and throughput, by reducing the number of IOPS generally and random TOPS in particular.

Figure 1:
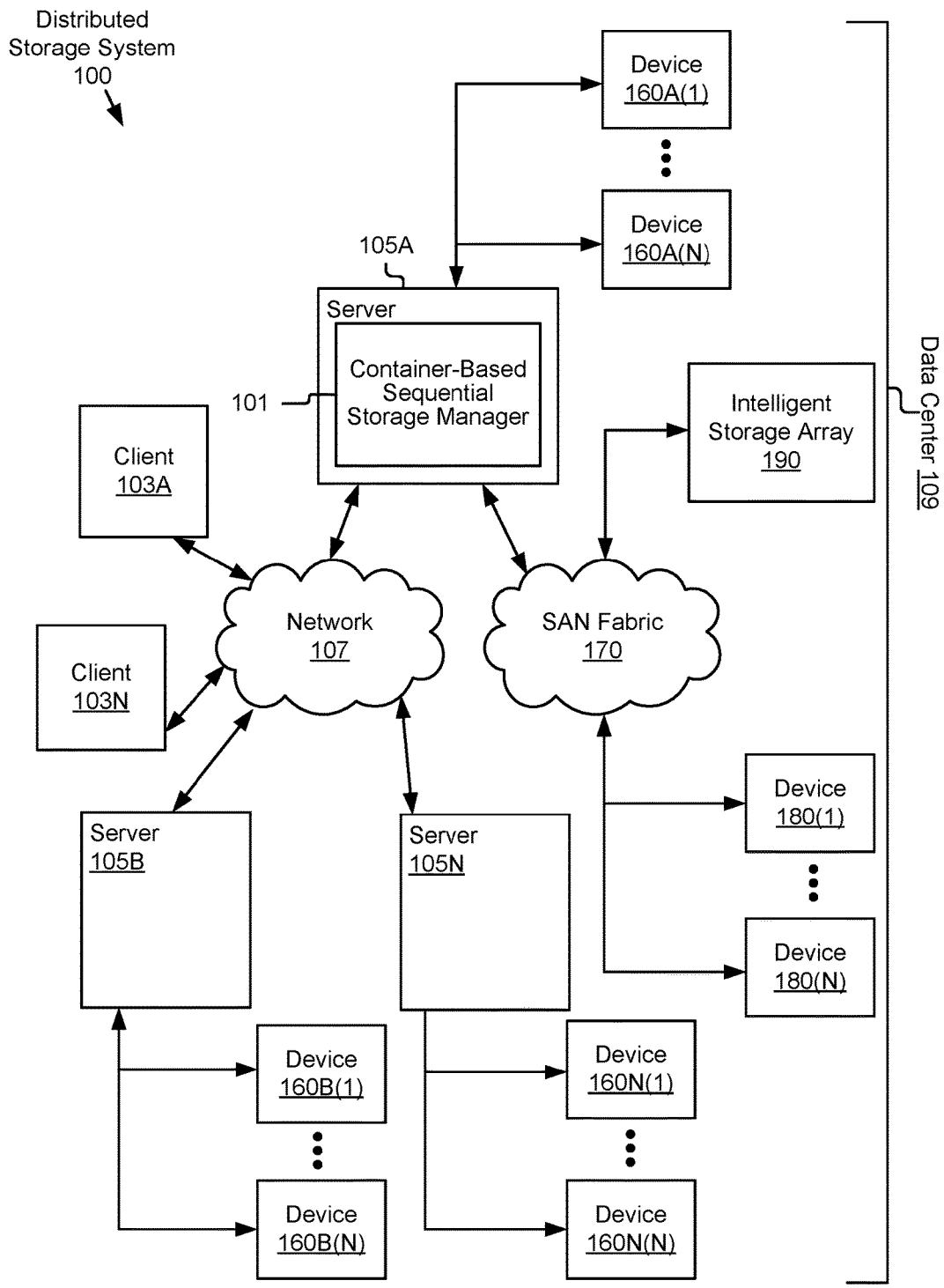
FIG. 1 is a diagram of a distributed encoded storage system in which a container-based sequential storage manager can operate, according to one embodiment.

FIG. 1 illustrates an exemplary datacenter 109 in a distributed encoded storage system 100 in which a container-based sequential storage manager 101 can operate, according to one embodiment. In the illustrated distributed encoded storage system 100, datacenter 109 comprises storage servers 105A, 105B and 105N, which are communicatively coupled via a network 107. A container-based sequential storage manager 101 is illustrated as residing on storage server 105A. It is to be understood that the container-based sequential storage manager 101 can reside on more, fewer or different computing devices, and/or can be distributed between multiple computing devices, as desired. In FIG. 1, storage server 105A is further depicted as having storage devices 160A(1)-(N) attached, storage server 105B is further depicted as having storage devices 160B(1)-(N) attached, and storage server 105N is depicted with storage devices 160N(1)-(N) attached. It is to be understood that storage devices 160A(1)-(N), 160B(1)-(N) and 160N(1)-(N) can be instantiated as electromechanical storage such as hard disks, solid state storage such as flash memory, other types of storage media, and/or combinations of these.

Although three storage servers 105A-N each coupled to three devices 160(1)-(N) are illustrated for visual clarity, it is to be understood that the storage servers 105A-N can be in the form of rack mounted computing devices, and datacenters 109 can comprise many large storage racks each housing a dozen or more storage servers 105, hundreds of storage devices 160 and a fast network 107. It is further to be understood that although FIG. 1 only illustrates a single datacenter 109, a distributed encoded storage system can comprise multiple datacenters, including datacenters located in different cities, countries and/or continents.

Figure 2:
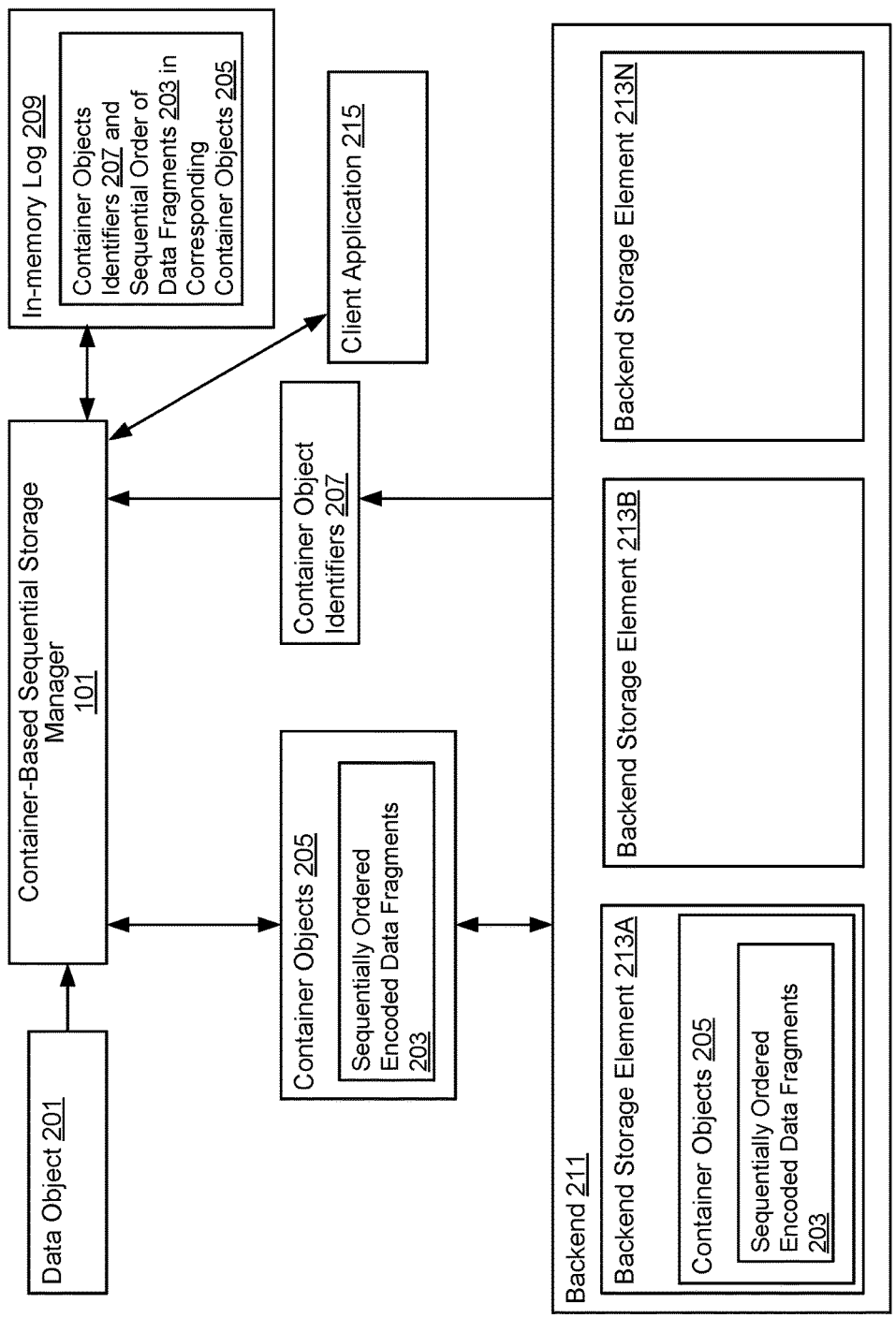
FIG. 2 is a diagram illustrating the operation of a container-based sequential storage manager, according to one embodiment.

It is to be understood that although the embodiment described in conjunction with FIG. 2 is directed to object storage, in other embodiments the container-based sequential storage manager 101 can operate in the context of other storage architectures. As an example of another possible storage architecture according to some embodiments, server 105A is depicted as also being connected to a SAN fabric 170 which supports access to storage devices 180(1)-(N). Intelligent storage array 190 is also shown as an example of a specific storage device accessible via SAN fabric 170. As noted above, SAN 170 is shown in FIG. 1 only as an example of another possible architecture to which the container-based sequential storage manager 101 might be applied in another embodiment. In yet other embodiments, shared storage can be implemented using FC and iSCSI (not illustrated) instead of a SAN fabric 170.

Turning to FIG. 2, in one example embodiment client applications 215 issue storage or put commands to store data objects 201, which result in write operations of data to backend storage elements 213 of the distributed encoded data storage system 100. A data object 201 being stored on the backend 211 is typically encoded into a plurality of encoded data fragments 203 of a given size (for example, in one embodiment 1 MB each). It is to be understood that the specific encoding format used to encode the data object 201 into encoded data fragments 203 can vary between embodiments, as can the size of the encoded data fragments 203. These data fragments 203 would conventionally be written to backend storage elements 213. As described in more detail below, the container-based sequential storage manager 101 can group a set of multiple data fragments 203 of a data object 201 into a container object 205 in a sequential order, and store the container object directly on a backend storage element 213, such as a hard disk, e.g., without the use of a file system. Note that the data fragments 203 of multiple separate data objects 201 can be stored in the same container object 205. For example, in an instance where multiple small data objects 201 are being encoded and stored, the corresponding encoded data fragments 203 can be combined into a single container object 205, as opposed to writing a new separate container object 205 for each data object 201.

A container object 205 can be orders of magnitude larger than a data fragment 203. For example, in one embodiment container objects 205 are 256 MB each, although it is to be understood that container objects 205 can be other sizes in other embodiments. As will be apparent, in an example embodiment in which data fragments 203 are 1 MB each and container objects 205 are 256 MB each, each container object 205 can contain two hundred and fifty six data fragments 203. In this way, many fewer distinct entities (i.e., container objects 205 as opposed to data fragments 203) are stored on the backend storage elements 213. For example, in one scenario approximately ten thousand container objects 205 may be stored per backend storage element 213, as opposed to 256 times more data fragments 203 than that (the exact number varies depending upon the sizes of the container objects 205, the data fragments 203 and the backend storage elements 213). As a result, the amount of associated metadata is substantially less than in conventional systems in which individual data fragments 203 are stored on the backend storage elements 213. As explained in detail below, this enables the maintenance of this metadata in system memory, thereby increasing the responsiveness of read and write operations, and reducing the number of associated IOPS.

Container objects 205 can be sequentially stored on the backend storage elements 213 without making use of a file system or similar data structure. In one embodiment, the backend storage elements are in the form of shingled magnetic recording ("SMR") disks. SMR is a hard disk technology according to which the tracks on a platter are partially overlapped (i.e., are layered on top of each other), like roof shingles. This increases platter density, and thus enables significant capacity gains per disk. However, because the tracks overlap and write heads are wider than read heads, writing to one track results in the overwriting of adjacent tracks, which thus need to be rewritten as well. This can be managed by writing sequentially to the disk. In some embodiments the container objects 205 are of a predetermined fixed size, which can correspond to the size of a single SMR band. In this way, container objects 205 can be directly matched to physical locations on SMR disks. In this embodiment, the only metadata needed for retrieval of a particular item (e.g., data fragment 203) of a container object 205 is the identifier 207 of the container object 205, and the offset of the targeted item within the container object 205. The container object identifier 207 and the offset allow for a direct translation to a physical location parameter on the storage media, such as the disk sector or the like (e.g., the SMR band of the SMR disk in an example embodiment in which this form of storage media is used), without the need for an intermediate file system. Note that in this and other embodiments described herein, container objects 205 are stored directly on backend storage elements 213 without using a file system. It is to be understood that in other embodiments, the functionality described herein can be utilized in a scenario in which a file system is used. Although the use of the container-based sequential storage manager 101 as described herein eliminates the need for the use of a file system in this context to great advantage, even where a file system is present the operation of the container-based sequential storage manager 101 still results in sequential I/O and hence less IOPs and less metadata to be stored. Although the above example is described using SMRs disks, in other embodiments the backend storage elements 213 can be in the form of other types of sequential storage media as desired, for example optical storage elements, tape based storage elements, microwave-assisted magnetic recording (MAMR) disks, heat-assisted magnetic recording (HAMR) disks, etc.

In one embodiment, the container-based sequential storage manager 101 groups data fragments 203 encoded from data objects 201 into container objects 205 as described above. Each container object 205 can be a single predetermined size. In one embodiment, the predetermined size is selected to pertain to the SMR band size of SMR disks in use as backend storage elements 213. As the container-based sequential storage manager 101 assigns specific data fragments 203 to a given container object 205, the container-based sequential storage manager 101 can track the sequential order of the data fragments 203 in the container object 205. The container-based sequential storage manager 101 can transmit the container object 205 to the backend 211 for storage, for example on an SMR band of an SMR disk. In response, the backend 211 returns a container object identifier 207 corresponding to the container 205. The container object identifier 207 can identify the physical storage location of the container object 205 on the backend storage element 213 (e.g., the SMR band of an SMR disk). The container-based sequential storage manager 101 now has the container object identifier 207, and the sequential order of the data fragments 203 in the container object 205. Because the data fragments are all the same size and this size is known, the container-based sequential storage manager 101 can determine the specific location of any specific data fragment 203 in the container object 205, which is a function of the position of the specific data fragment 203 in tracked sequential order (e.g., the offset of the data fragment 203 from the beginning of the container object 205) and the data fragment size. Because the physical location of the container object 205 the backend storage element 213 is known from the container object identifier 207, the container-based sequential storage manager 101 can locate and retrieve any specific data fragment 203 in the container object 205 from the backend 211 without the use of a filesystem (or in other embodiments with one).

As described in more detail below, the container-based sequential storage manager 101 can track all container objects 203 written to the backend 211 by corresponding container objects identifier 207 in a sequential transaction log 209 in system memory. In addition, the sequential order of data fragments 203 in each given container object 205 can be tracked in the sequential transaction log 209. As described above, in one embodiment the backend storage elements 213 comprise SMR disks, and the container object size corresponds to the SMR band size, so that the container objects 205 are stored sequentially on an SMR disk, one container object 205 per band. In addition, because the data fragments 203 are of a known uniform size, the offset of each data fragment from the beginning of the container object 205 can be determined from the logged sequential order of the data fragments 205 with the container object 205. Thus, by tracking this information in the sequential transaction log 209, the container-based sequential storage manager 101 maintains all of the metadata needed to determine the physical location on the backend storage elements 213 of any container object 205, and any data fragment 203 within any container object 205. The sequential transaction log 209 can thus be used to retrieve any such stored data from the backend 211. Because the sequential transaction log 209 is much smaller than a file system or similar data structure, it can be stored entirely in system memory.

In one embodiment, the sequential log architecture described in issued patent U.S. Pat. No. 9,256,383 is used to maintain the sequential transaction log 209 in system memory. The content of U.S. Pat. No. 9,256,383 is included herein by reference. In other embodiments, other log structures are used as desired. As noted above and described in greater detail below, the sequential transaction log 209 tracks the sequential order in which data is sequentially appended to the backend storage elements 213, such that the sequential order in which specific container objects 205 are stored on the backend is tracked, as well as the identification of the specific container objects 205 and the sequential order of specific data fragments 203 therein. The sequential transaction log 209 can thus be used to derive the physical location of any specific container object 205 and any specific data fragment 203 within any specific container object 205 on backend storage, and hence retrieve such data. Associations between data fragments 203 and corresponding data objects 201 can also be maintained (at a data fragment 203 or container object 205 level). Thus, specific data fragments 203 can be retrieved, and given data objects 201 decoded as desired. The sequential transaction log 209 is maintained instead of a file system or similar data structure, and can be maintained in system memory by the container-based sequential storage manager 101. Such an approach is well suited for, but not limited to, use with container-based storage on SMR disks, as this allows for adding new data to such SMR disks in a sequential way, one SMR band at a time. It is to be understood that the exact format of the sequential transaction log 209 is a variable design parameter.

In one embodiment, the above described functionality can be used to stage write operations to backend storage elements 213. As noted above, client applications 215 issue storage or put commands to store data objects 201, which result in write operations of data to backend storage elements 213. As also noted above, a given data objects 201 is encoded into a plurality of data fragments 203, to be stored on the backend 211. Conventionally, individual data fragments 203 are written to the backend 211, via a series of write operations that are executed in a random order. In one embodiment, in order to group the data fragments 203 into container objects 205 and store the container objects 205 on the backend 211 (as opposed to the individual data fragments 203), the (random) sequence of data fragment-level write operations is tracked in the sequential transaction log 209 in system memory. This tracking can be performed, for example, by using the sequential log architecture described in issued U.S. Pat. No. 9,256,383, or by using other log functionality/structures as desired. The container-based sequential storage manager 101 can reorder these tracked write operations, which are received in a random sequence, in order to write entire container objects 205 to the backend 211, and thus further reduce random IOPS at the level of the backend storage elements 213. This reordering of these write operations can be performed while the operations themselves are still being processed in system memory.

More specifically, as a sequence of write operations of data fragments 203 are executed in a random order, the sequence of write operations of the data fragments 203 can be tracked in the sequential transaction log 209 in system memory, and reordered such that the write operations of the data fragments 203 being grouped into a specific single container object 205 are filtered from the sequential transaction log 209. The data fragments 203 being grouped to the single container object 205 can thus be sorted into their sequential order corresponding to their position in the container object 205, while still being processed in system memory. In this embodiment, the container object 205 itself is only written from system memory to a backend storage element 213 such as a disk (e.g., an SMR disk) after this staging of the write operations into the sequential order of the container object 205 has occurred. It is to be understood that such staging of the write operations, and thus the ordering of the data fragments 203 in the container object 205, still further reduces the number of random read and write operations, and increases the number of sequential read and write operations at the level of the backend storage elements 213, while the distributed encoded storage system 100 is in use. Typically, sequential read/write operations are more efficient than random read/write operations, especially when the backend storage elements 213 are hard disks. This is especially relevant when use is made of sequential hard disks such as SMR disks, or other sequential storage elements.

It is to be understood that in different embodiments a single or separate logs can be used to track 1) the write operations being processed in system memory and 2) the metadata associated with container objects 205 and the data fragments 203 contained therein. As noted above, the exact format of the sequential transaction log(s) 209 can vary between embodiments as desired.

FIGS. 1-2 illustrate a container-based sequential storage manager 101 residing on a single storage server 105. It is to be understood that this is just an example. The functionalities of the container-based sequential storage manager 101 can be implemented on other computing devices in other embodiments, or can be distributed between multiple computing devices. It is to be understood that although the container-based sequential storage manager 101 is illustrated in FIG. 1 as a standalone entity, the illustrated container-based sequential storage manager 101 represents a collection of functionalities, which can be instantiated as a single or multiple modules on one or more computing devices as desired.

It is to be understood the container-based sequential storage manager 101 can be instantiated as one or more modules (for example as object code or executable images) within the system memory (e.g., RAM, ROM, flash memory, DRAM) of any computing device, such that when the processor of the computing device processes a module, the computing device executes the associated functionality. As used herein, the terms "computer system," "computer," "client," "client computer," "server," "server computer" and "computing device" mean one or more computers configured and/or programmed to execute the described functionality. Additionally, program code to implement the functionalities of the container-based sequential storage manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. The illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

Note that, although the terms "first," "second," and so forth may be used herein to describe various elements, these elements are not to be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. Also note that the term "and/or" as used herein refers to and encompasses any and/or all possible combinations of one or more of the associated listed items. Furthermore, the terms "comprises" and/or "comprising," when used in this specification, specify the presence of stated features, integers, blocks, steps, operations, elements, and/or components, but do not preclude the presence or addition of one or more other features, integers, blocks, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As will be understood by those skilled in the art, the invention may be embodied in other specific forms without departing from the spirit or essential characteristics thereof. Likewise, the particular naming and division of the portions, modules, servers, managers, components, functions, procedures, actions, layers, features, attributes, methodologies, data structures and other aspects are not mandatory or significant, and the mechanisms that implement the invention or its features may have different names, divisions and/or formats. The foregoing description, for the purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method, comprising:
    encoding a data object into a plurality of encoded data fragments, each encoded data fragment being of a common fragment format and being a common data fragment size;
    grouping a set of encoded data fragments into a container object in a sequential order, each encoded data fragment being the common data fragment size, and the container object being a specific predetermined container object size;
    tracking, in a sequential transaction log, the sequential order of the set of encoded data fragments in the container object, wherein a location of any specific one of the set of encoded data fragments in the container object is a function of a position of the specific data fragment in the tracked sequential order and the common data fragment size;
    transmitting the container object to a backend of a distributed encoded data storage system, wherein the container object is stored directly on a specific backend storage element;
    in response to transmitting the container object, receiving a container object identifier corresponding to the container object, from the backend of the distributed encoded data storage system, wherein the container object identifier identifies a physical storage location of the container object on the specific backend storage element; and
    tracking the received container object identifier in the sequential transaction log, wherein a physical location on the specific backend storage element of any specific one of the set of encoded data fragments in the container object is a function of a position of the specific data fragment in the tracked sequential order, the common data fragment size, and the physical storage location of the container object on the specific backend storage element as identified by the tracked container object identifier.

2. The computer-implemented method of claim 1, wherein:
    the specific backend storage element further comprises a shingled magnetic recording (SMR) disk.

3. The computer-implemented method of claim 2, wherein:
    the specific predetermined container object size corresponds to a size of a band of the SMR disk.

4. The computer-implemented method of claim 2, wherein storing the container object directly on the specific backend storage element further comprises:

storing the container object directly on a specific band of the SMR disk.

5. The computer-implemented method of claim 2, wherein a physical storage location of the container object on the specific backend storage element further comprises:
a specific band of the SMR disk.

6. The computer-implemented method of claim 1, further comprising:
transmitting a second container object containing a second set of encoded data fragments to the backend of the distributed encoded data storage system, wherein the second container object is stored sequentially after the first container object on the specific backend storage element;
in response to transmitting the second container object, receiving a second container object identifier corresponding to the second container object, from the backend of the distributed encoded data storage system, wherein the second container object identifier identifies a physical storage location of the second container object on the specific backend storage element; and
tracking the second received container object identifier in the sequential transaction log.

7. The computer-implemented method of claim 6, further comprising:
storing the first container object directly on a first specific band of a specific shingled magnetic recording (SMR) disk; and
storing the second container object directly on a second specific band of the specific SMR disk.

8. The computer-implemented method of claim 1, further comprising:
tracking data fragment-level write operations in the sequential transaction log;
reordering a random order sequence of tracked data fragment-level write operations while the tracked data fragment-level write operations are being processed in system memory, wherein reordering further comprises sorting the set of encoded data fragments being grouped into the container object into the tracked sequential order; and
subsequently to the reordering step, writing the container object from system memory to the specific backend storage element.

9. The computer-implemented method of claim 1, further comprising:
maintaining an association between the plurality of encoded data fragments and the data object.

10. The computer-implemented method of claim 1, further comprising:
receiving a read request from a client application targeting the data object;
retrieving the plurality of encoded data fragments from at least one container object on the specific backend storage element, using the sequential transaction log;
decoding the data object from the plurality of encoded data fragments; and
providing the data object to the client application.

11. The computer-implemented method of claim 1, further comprising:
retrieving a specific encoded data fragment from the specific backend storage element, using the sequential transaction log.

12. The computer-implemented method of claim 1, further comprising:
retrieving a specific container object from the specific backend storage element, using the sequential transaction log.

13. The computer-implemented method of claim 1, wherein:
the specific backend storage element further comprises a tape storage element.

14. The computer-implemented method of claim 1, wherein:
the specific backend storage element further comprises an optical storage element.

15. A computer system comprising:
a processor;
system memory;
a plurality of electromechanical backend storage elements;
instructions in the system memory programmed to encode a data object into a plurality of encoded data fragments, each encoded data fragment being of a common fragment format and being a common data fragment size;
instructions in the system memory programmed to group a set of encoded data fragments into a container object in a sequential order, each encoded data fragment being the common data fragment size, and the container object being a specific predetermined container object size;
instructions in the system memory programmed to track, in a sequential transaction log, the sequential order of the set of encoded data fragments in the container object, wherein a location of any specific one of the set of encoded data fragments in the container object is a function of a position of the specific data fragment in the tracked sequential order and the common data fragment size;
instructions in the system memory programmed to transmit the container object to a backend of a distributed encoded data storage system, wherein the container object is stored directly on a specific backend storage element without using a file system;
instructions in the system memory programmed to receive a container object identifier corresponding to the container object, from the backend of the distributed encoded data storage system, in response to transmitting the container object, wherein the container object identifier identifies a physical storage location of the container object on the specific backend storage element; and
instructions in the system memory programmed to track the received container object identifier in the sequential transaction log in system memory, wherein a physical location on the specific backend storage element of any specific one of the set of encoded data fragments in the container object is a function of a position of the specific data fragment in the tracked sequential order, the common data fragment size, and the physical storage location of the container object on the specific backend storage element as identified by the tracked object container object identifier.

16. The computer system of claim 15 wherein:
the specific backend storage element further comprises a shingled magnetic recording (SMR) disk.

17. The computer system of claim 16 wherein:
the specific predetermined container object size corresponds to a size of a band of the SMR disk.

18. The computer system of claim 16 further comprising:
instructions in the system memory programmed to store a first container object directly on a first specific band of the SMR disk; and
instructions in the system memory programmed to store the second container object directly on a second specific band of the specific SMR disk.

19. The computer system of claim 15 further comprising:
instructions in the system memory programmed to track data fragment-level write operations in the sequential transaction log in system memory;
instructions in the system memory programmed to reorder a random order sequence of tracked data fragment-level write operations while the tracked data fragment-level write operations are being processed in system memory, wherein reordering further comprises sorting the set of encoded data fragments being grouped into the container object into the tracked sequential order; and
instructions in the system memory programmed to write the container object from system memory to the specific backend storage element, subsequently to the reordering the random order sequence of tracked data fragment-level write operations.

20. A computer system comprising:
means for encoding a data object into a plurality of encoded data fragments, each encoded data fragment being of a common fragment format and being a common data fragment size;
means for grouping a set of encoded data fragments into a container object in a sequential order, each encoded data fragment being the common data fragment size, and the container object being a specific predetermined container object size;
means for tracking, in a sequential transaction log, the sequential order of the set of encoded data fragments in the container object, wherein a location of any specific one of the set of encoded data fragments in the container object is a function of a position of the specific data fragment in the tracked sequential order and the common data fragment size;
means for transmitting the container object to a backend of a distributed encoded data storage system, wherein the container object is stored directly on a specific backend storage element without using a file system;
means for receiving a container object identifier corresponding to the container object, from the backend of the distributed encoded data storage system, in response to transmitting the container object, wherein the container object identifier identifies a physical storage location of the container object on the specific backend storage element; and
means for tracking the received container object identifier in the sequential transaction log in system memory, wherein a physical location on the specific backend storage element of any specific one of the set of encoded data fragments in the container object is a function of a position of the specific data fragment in the tracked sequential order, the common data fragment size, and the physical storage location of the container object on the specific backend storage element as identified by the tracked container object identifier.

* * * * *